(12) United States Patent
Tashiro et al.

(10) Patent No.: US 11,009,247 B2
(45) Date of Patent: May 18, 2021

(54) AIR CONDITIONER

(71) Applicant: Mitsubishi Electric Corporation, Tokyo (JP)

(72) Inventors: Yusuke Tashiro, Tokyo (JP); Yasuhide Hayamaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/603,678

(22) PCT Filed: Jun. 27, 2017

(86) PCT No.: PCT/JP2017/023497
§ 371 (c)(1),
(2) Date: Oct. 8, 2019

(87) PCT Pub. No.: WO2019/003291
PCT Pub. Date: Jan. 3, 2019

(65) Prior Publication Data
US 2020/0116374 A1   Apr. 16, 2020

(51) Int. Cl.
*F24F 11/42*    (2018.01)
*F24F 11/81*    (2018.01)
*F24F 11/84*    (2018.01)

(52) U.S. Cl.
CPC .............. *F24F 11/42* (2018.01); *F24F 11/81* (2018.01); *F24F 11/84* (2018.01)

(58) Field of Classification Search
CPC .. F24F 11/42; F24F 11/81; F24F 11/84; F25B 2313/025; F25B 2313/02522;
(Continued)

(56) References Cited

U.S. PATENT DOCUMENTS 4,770,000 A * 9/1988 Kuroda ................... F25B 41/20
62/156
9,506,674 B2 * 11/2016 Morimoto ............... F25B 13/00
(Continued)

FOREIGN PATENT DOCUMENTS

| JP | S49-052343 A | 5/1974 |
| JP | 2012-068001 A | 4/2012 |
| WO | 2017/094148 A1 | 6/2017 |

OTHER PUBLICATIONS

International Search Report of the International Searching Authority dated Sep. 19, 2017 for the corresponding international application No. PCT/JP2017/023497 (and English translation).

*Primary Examiner* — Nelson J Nieves
(74) *Attorney, Agent, or Firm* — Posz Law Group, PLC (57) ABSTRACT

An air conditioner includes a switching valve, a flow rate restricting portion and an on-off valve. The switching valve provided in a flow path between a compressor and an outdoor heat exchanger. The outdoor heat exchanger includes a heat exchange portion and a heat exchange portion. During heating operation, the switching valve causes a second connection port, a third connection port and a first connection port to communicate with one another. The flow rate restricting portion and the on-off valve are connected in series between an outlet and an inlet of the compressor during the heating operation, to bypass a part of refrigerant. During defrosting operation of the heat exchange portion, the switching valve is configured such that a fourth connection port and the second connection port communicate with each other, and the third connection port and the first connection port communicate with each other.

2 Claims, 11 Drawing Sheets

(58) Field of Classification Search
CPC .. F25B 2313/02532; F25B 2313/02542; F25B 2313/02742
See application file for complete search history.

(56) References Cited

U.S. PATENT DOCUMENTS

| | | | |
|---|---|---|---|
| 2015/0292756 A1* | 10/2015 | Takenaka | F24F 5/001 62/160 |
| 2015/0292789 A1* | 10/2015 | Takenaka | F25B 47/022 62/140 |
| 2016/0273795 A1* | 9/2016 | Takenaka | F25B 47/022 |
| 2016/0370045 A1* | 12/2016 | Takenaka | F28D 1/0443 |
| 2017/0153050 A1* | 6/2017 | Nakagawa | F25B 31/006 |
| 2017/0219264 A1* | 8/2017 | Song | F25B 47/022 |
| 2018/0201088 A1* | 7/2018 | Nomura | F25B 47/02 |
| 2018/0266743 A1* | 9/2018 | Watanabe | F24F 11/89 |
| 2018/0328635 A1 | 11/2018 | Tashiro et al. | |

\* cited by examiner

| OPERATION MODE | (1-1) HEATING | (1-2) LOW-CAPACITY HEATING | (2-1) HEATING/DEFROSTING | (2-2) DEFROSTING/HEATING | (3) COOLING |
|---|---|---|---|---|---|
| SWITCHING VALVE (202) | | | | | |
| PRESSURE | A ··· LOW PRESSURE<br>B1,B2 ··· LOW PRESSURE<br>C ··· HIGH PRESSURE | A ··· LOW PRESSURE<br>B1,B2 ··· LOW PRESSURE<br>C ··· MEDIUM PRESSURE | A,B1 ··· LOW PRESSURE<br>B2,C ··· MEDIUM PRESSURE | A,B2 ··· LOW PRESSURE<br>B1,C ··· MEDIUM PRESSURE | A ··· LOW PRESSURE<br>B1,B2 ··· HIGH PRESSURE<br>C ··· HIGH PRESSURE |
| FOUR-WAY VALVE (291) | CLOSED | OPEN | CLOSED | CLOSED | OPEN |
| ON-OFF VALVE (204) | CLOSED | OPEN | CLOSED | CLOSED | OPEN |

FIG.5
HEATING

FIG.6
HEATING (LOW-CAPACITY OPERATION)

FIG.7
CONTINUOUS HEATING (HEATING/DEFROSTING)

FIG.8
CONTINUOUS HEATING (DEFROSTING/HEATING)

FIG.9
COOLING

HEATING

FIG.12

HEATING & DEFROSTING

AIR CONDITIONER

CROSS REFERENCE TO RELATED APPLICATION

This application is a U.S. national stage application of PCT/JP2017/023497 filed on Jun. 27, 2017, the contents of which are incorporated herein by reference.

TECHNICAL FIELD

The present invention relates to an air conditioner.

BACKGROUND ART

Japanese Patent Laying-Open No. 49-52343 (PTL 1) discloses a heat pump-type cooling and heating apparatus configured to, during heating operation, efficiently perform defrosting of an outdoor heat exchanger operating as an evaporator, without stopping the heating operation.

CITATION LIST

Patent Literature

PTL 1: Japanese Patent Laying-Open No. 49-52343

SUMMARY OF INVENTION

Technical Problem

In the cooling and heating apparatus described in Japanese Patent Laying-Open No. 49-52343, a flow path switching valve is used, in addition to a four-way valve. Japanese Patent Laying-Open No. 49-52343 also describes that four solenoid valves are used in combination as the flow path switching valve. However, the solenoid valves are high in pressure loss.

Instead of the solenoid valves, an electric valve driven by a motor can also be used. However, the electric valve is large in size. Therefore, reduction in size of the outdoor heat exchanger is difficult and the manufacturing cost is also high.

It is also conceivable to use, as the flow path switching valve, a differential pressure driven-type valve capable of reducing a pressure loss, which is similar to a commonly-used four-way valve. In this case, however, it is necessary to prepare an introduction pipe configured to introduce a suction-side pressure and a discharge-side pressure of a compressor required to drive the valve. Therefore, a pipe structure such as routing of the introduction pipe becomes complicated and the number of welded portions increases, which leads to lower workability during manufacturing.

Furthermore, airtightness and thermal insulation of buildings have become increasingly higher in recent years and very low-capacity heating operation is required after the room temperature is stabilized. An operation capacity of the compressor can be increased and decreased by changing an operation frequency. However, a lower limit of the operation frequency is set, and thus, the very low-capacity heating operation cannot be performed continuously and repeated operation and stop of the compressor cause variation in room temperature.

The present invention has been made in light of the above-described problem, and an object of the present invention is to provide an air conditioner that makes it possible to reduce a lower limit capacity of heating operation and to perform defrosting with a simple structure without stopping the heating operation.

Solution to Problem

An air conditioner according to the present disclosure is configured such that refrigerant circulates through a compressor, an indoor heat exchanger, an expansion valve, and an outdoor heat exchanger in this order during heating operation. The air conditioner includes a switching valve, a flow rate restricting portion and an on-off valve. The switching valve is provided in a flow path between the compressor and the outdoor heat exchanger. The outdoor heat exchanger includes a first heat exchange portion and a second heat exchange portion, each of the first heat exchange portion and the second heat exchange portion having an independent flow path.

The switching valve includes: a first connection port connected to an inlet of the compressor; a second connection port connected to the first heat exchange portion; a third connection port connected to the second heat exchange portion; and a fourth connection port connected to an outlet of the compressor. During the heating operation, the second connection port, the third connection port and the first connection port communicate with one another, and do not communicate with the fourth connection port. During defrosting operation of the first heat exchange portion, the fourth connection port and the second connection port communicate with each other, and the third connection port and the first connection port communicate with each other.

During defrosting operation of the second heat exchange portion, the fourth connection port and the third connection port communicate with each other, and the second connection port and the first connection port communicate with each other.

The flow rate restricting portion and the on-off valve are connected in series between the outlet and the inlet of the compressor during the heating operation.

Advantageous Effects of Invention

The air conditioner according to the present disclosure can alternate defrosting of the outdoor heat exchanger between the first heat exchange portion and the second heat exchange portion, and can also operate in a low-capacity heating operation state.

DESCRIPTION OF EMBODIMENTS

An embodiment of the present invention will be described in detail hereinafter with reference to the drawings, in which the same or corresponding portions are denoted by the same reference characters and description thereof will not be repeated.

A configuration of an air conditioner according to the present embodiment will be described in comparison with a study example.

Figure 1:
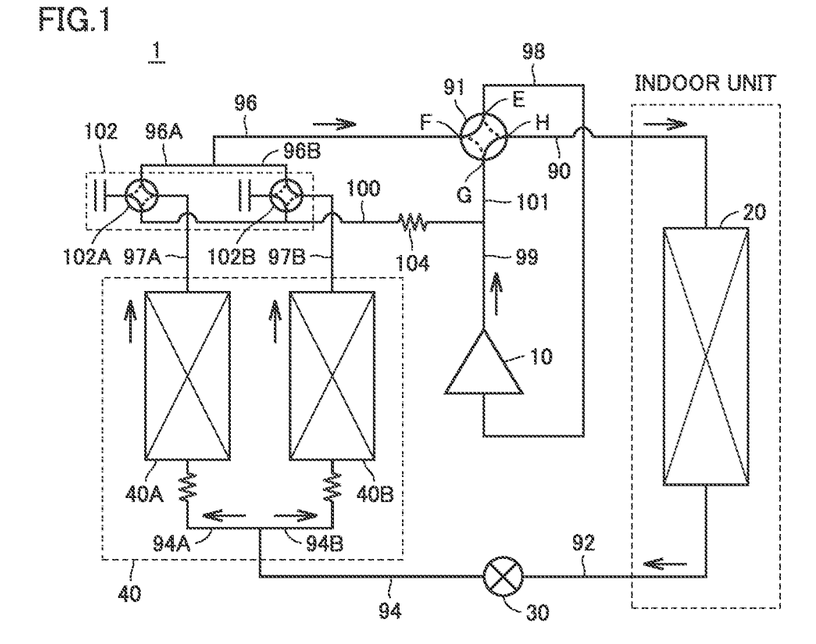
FIG. 1 is a configuration diagram of an air conditioner 1 according to a study example.
Figure 2:
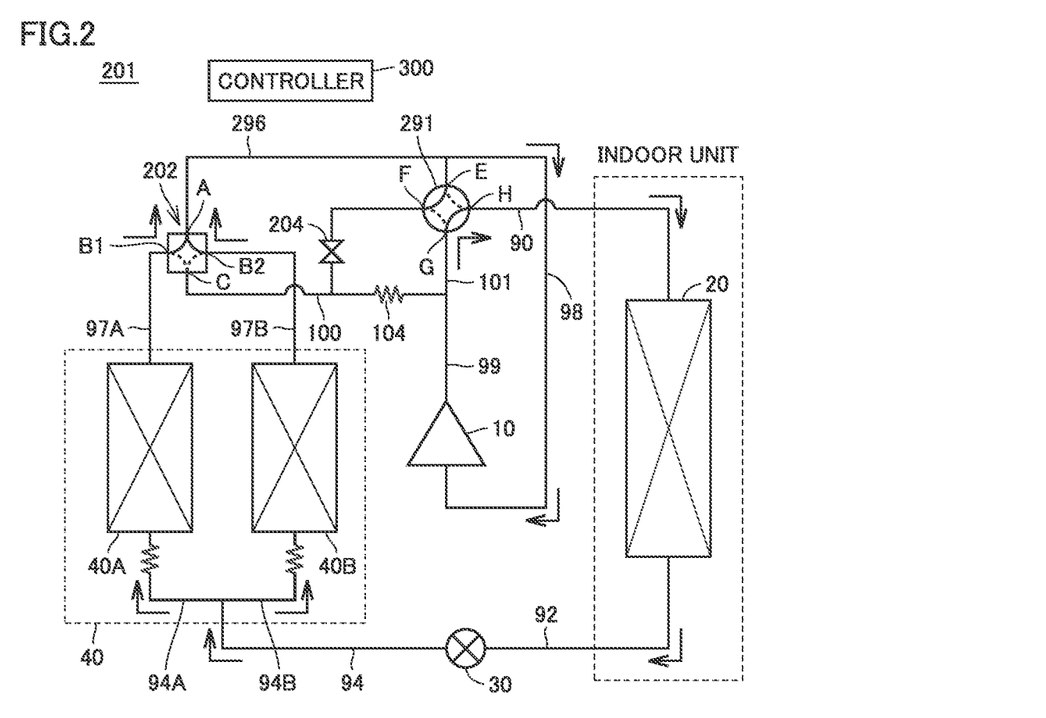
FIG. 2 is a configuration diagram of an air conditioner 201 according to the present embodiment.

FIG. 1 is a configuration diagram of an air conditioner 1 according to a study example. FIG. 2 is a configuration diagram of an air conditioner 201 according to the present embodiment. First, components common to FIGS. 1 and 2 will be described.

Referring to FIGS. 1 and 2, air conditioner 1, 201 includes a compressor 10, an indoor heat exchanger 20, an expansion valve 30, an outdoor heat exchanger 40, and a four-way valve 91 (291). Outdoor heat exchanger 40 includes a heat exchange portion 40A and a heat exchange portion 40B. Heat exchange portion 40A and heat exchange portion 40B are formed, for example, by vertically splitting outdoor heat exchanger 40 into two pieces.

A pipe 90 connects a port H of four-way valve 91 (291) and indoor heat exchanger 20. A pipe 92 connects indoor heat exchanger 20 and expansion valve 30. A pipe 94 branches off partway into a pipe 94A and a pipe 94B, and connects expansion valve 30 and heat exchange portions 40A and 40B.

An outlet and an inlet of compressor 10 are connected to ports G and E of four-way valve 91 (291), respectively. Pipes 97A and 97B connect heat exchange portion 40A and heat exchange portion 40B to a flow path switching portion 102 (FIG. 1) or a flow path switching valve 202 (FIG. 2), respectively. A pipe 99 has one end connected to the outlet of compressor 10 and branches off partway into a pipe 100 and a pipe 101. Pipe 100 is provided with a flow rate restricting portion 104 at some point along pipe 100 and is connected to flow path switching portion 102 (four-way valves 102A and 102B in FIG. 1) or flow path switching valve 202 (a port C in FIG. 2). Pipe 101 connects pipe 99 and a port G of four-way valve 91 (291).

Expansion valve 30 is arranged at some point along a refrigerant path formed of pipe 92 and pipe 94 that connect indoor heat exchanger 20 and outdoor heat exchanger 40.

Air conditioner 1, 201 further includes a not-shown pressure sensor, a not-shown temperature sensor and a controller 300.

Compressor 10 is configured to change an operation frequency in accordance with a control signal received from controller 300. By changing the operation frequency of compressor 10, an output of compressor 10 is adjusted. Various types of compressors can be used as compressor 10, and a compressor of rotary type, of reciprocating type, of scroll type, of screw type or the like may be used, for example.

In the configuration shown in FIG. 1, a pipe 96 connects heat exchange portion 40A and heat exchange portion 40B to a port F of four-way valve 91, with flow path switching portion 102 being interposed. During heating operation, four-way valve 91 connects the outlet (pipe 101) of compressor 10 and pipe 90 as shown by a solid line, and connects the inlet (a pipe 98) of compressor 10 and pipe 96. During cooling operation, four-way valve 91 connects the outlet of compressor 10 and pipe 96 as shown by a broken line, and connects the inlet of compressor 10 and pipe 90.

In contrast, in the configuration shown in FIG. 2, a pipe 296 connects heat exchange portion 40A and heat exchange portion 40B to pipe 98, with flow path switching valve 202 being interposed. During the heating operation, four-way valve 291 connects the outlet of compressor 10 and pipe 90 as shown by a solid line, and connects the inlet of compressor 10 to pipe 100 with an on-off valve 204 being interposed. During the cooling operation, four-way valve 291 connects the outlet of compressor 10 to pipe 100 with on-off valve 204 being interposed as shown by a broken line, and connects the inlet of compressor 10 to pipe 90.

In FIGS. 1 and 2, a direction of a flow of refrigerant during heating is shown by an arrow.

First, a basic operation of the heating operation will be described. During the heating operation, the refrigerant flows in the direction shown by the arrow. In FIG. 1, compressor 10 sucks the refrigerant from pipe 96 through four-way valve 91 and pipe 98 and compresses the refrigerant. In FIG. 2, compressor 10 sucks the refrigerant from pipe 296 through pipe 98 and compresses the refrigerant. The compressed refrigerant flows to pipe 90 through four-way valve 91.

Indoor heat exchanger 20 (condenser) condenses the refrigerant flowing from compressor 10 into pipe 90 through four-way valve 91 (291) and causes the refrigerant to flow to pipe 92. Indoor heat exchanger 20 (condenser) is configured to perform heat exchange (heat dissipation) between high-temperature and high-pressure superheated vapor (refrigerant) discharged from compressor 10 and the indoor air. As a result of the heat exchange, the refrigerant is condensed and liquefied. Although not shown, an indoor unit fan is provided together with indoor heat exchanger 20 (condenser) and controller 300 adjusts a rotation speed of the indoor unit fan in accordance with a control signal. By changing the rotation speed of the indoor unit fan, an amount of heat exchange between the refrigerant in indoor heat exchanger 20 (condenser) and the indoor air can be adjusted.

Expansion valve 30 decompresses the refrigerant flowing from indoor heat exchanger 20 (condenser) to pipe 92. The decompressed refrigerant flows to pipe 94. Expansion valve 30 is configured such that the degree of opening thereof can be adjusted in accordance with a control signal received from controller 300. When the degree of opening of expansion valve 30 is changed in a closing direction, a refrigerant pressure on the exit side of expansion valve 30 decreases and the degree of dryness of the refrigerant increases. On the other hand, when the degree of opening of expansion valve 30 is changed in an opening direction, the refrigerant pressure on the exit side of expansion valve 30 increases and the degree of dryness of the refrigerant decreases.

Outdoor heat exchanger 40 (evaporator) evaporates the refrigerant flowing from expansion valve 30 to pipe 94. The evaporated refrigerant flows to pipe 96 (or pipe 296) through flow path switching portion 102 (or flow path switching valve 202). Outdoor heat exchanger 40 (evaporator) is configured to perform heat exchange (heat absorption) between the refrigerant decompressed by expansion valve 30 and the outdoor air. As a result of the heat exchange, the refrigerant evaporates into superheated vapor. A not-shown outdoor unit fan is provided together with outdoor heat exchanger 40 (evaporator). Controller 300 adjusts a rotation speed of the outdoor unit fan in accordance with a control signal. By changing the rotation speed of the outdoor unit fan, an amount of heat exchange between the refrigerant in outdoor heat exchanger 40 (evaporator) and the outdoor air can be adjusted.

During the heating operation as described above, frost may in some cases form on outdoor heat exchanger 40 and defrosting may be required. In such a case, it is conceivable to temporarily switch the operation to the cooling operation and perform the defrosting operation for causing the high-temperature compressed refrigerant to flow to outdoor heat exchanger 40. However, the heating operation is interrupted and thus comfortableness in a room is compromised.

Accordingly, in the comparative example and the present embodiment, outdoor heat exchanger 40 is split into heat exchange portion 40A and heat exchange portion 40B, and defrosting is alternately performed. Flow path switching portion 102 or flow path switching valve 202 is provided to allow the high-temperature and high-pressure refrigerant from compressor 10 to flow to the heat exchanger that performs defrosting.

However, flow path switching portion 102 according to the comparative example in FIG. 1 includes two valves, i.e., four-way valves 102A and 102B. A differential pressure driven-type switching valve is widely used as four-way valve 91 because ports E and F are fixedly connected to the inlet and the outlet of compressor 10 in both of cooling and heating and a pressure relationship is fixed.

In contrast, as to four-way valves 102A and 102B, pipe 96 is connected to the inlet of compressor 10 and has a low pressure during heating, whereas pipe 96 is connected to the outlet of compressor 10 and has a high pressure during cooling. Therefore, four-way valves 102A and 102B do not have a port constantly supplied with a low pressure. In order to use common differential pressure driven-type switching valves as four-way valves 102A and 102B, it is necessary to route another pipe from pipe 98 to the vicinity of flow path switching portion 102. Therefore, the configuration of the example in FIG. 1 is complicated, and thus, there is room for improvement in reduction in size. Accordingly, in the present embodiment in FIG. 2, flow path switching valve 202 is provided, instead of flow path switching portion 102. Flow path switching by flow path switching valve 202 of air conditioner 201 according to the present embodiment will be described below.

Figure 3:
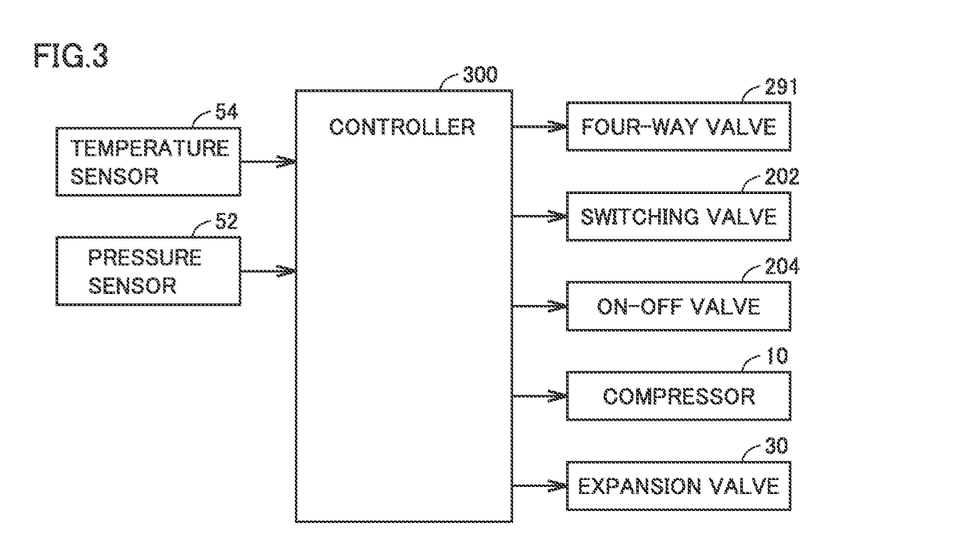
FIG. 3 is a block diagram for illustrating a connection relationship of a controller in the air conditioner according to the present embodiment.

FIG. 3 is a block diagram for illustrating a connection relationship of the controller in the air conditioner according to the present embodiment. Referring to FIG. 3, a pressure sensor 52 detects a pressure of the refrigerant at an exit of outdoor heat exchanger 40 (evaporator) and outputs the detection value to controller 300. A temperature sensor 54 detects a temperature of the refrigerant at the exit of outdoor heat exchanger 40 (evaporator) and outputs the detection value to controller 300.

Controller 300 includes a CPU (Central Processing Unit), a memory device, an input/output buffer and the like (all are not shown), and controls four-way valve 291, flow path switching valve 202, on-off valve 204, compressor 10, expansion valve 30 and the like in air conditioner 201. The control can be processed not only by software but also by dedicated hardware (electronic circuit).

Figure 4:
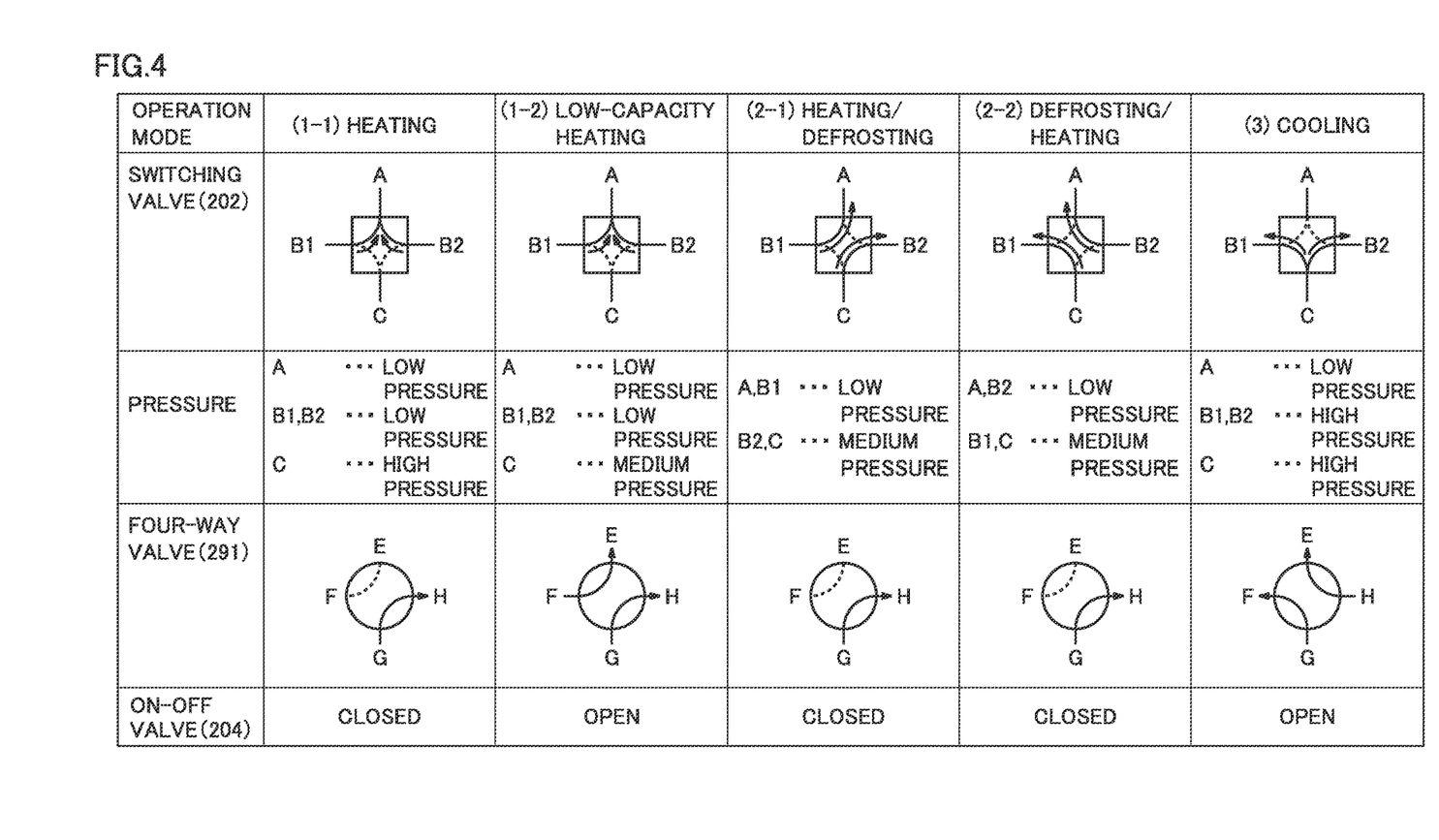
FIG. 4 shows a flow, a flow rate and a pressure of refrigerant in each operation mode of a flow path switching valve 202.

FIG. 4 shows a flow, a flow rate and a pressure of the refrigerant in each operation mode of flow path switching valve 202. FIGS. 5 to 9 show a flow of the refrigerant in each operation mode. Each operation mode will be described with reference to FIG. 4. Hereinafter, for convenience in distinction, a case of defrosting heat exchange portion 40A may be denoted as "heating/defrosting operation mode", and a case of defrosting heat exchange portion 40B may be denoted as "defrosting/heating operation mode".

(1-1) In a normal heating operation mode, flow path switching valve 202 is set such that a port B1, a port B2 and a port A communicate with one another and port C is cut off. The refrigerant flows from ports B1 and B2 to port A, and a state of the refrigerant at this time is, in one example, a gas-liquid two-phase state. Port A has a low pressure, ports B1 and B2 have a low pressure, and port C has a high pressure.

In four-way valve 291, the refrigerant flows from port G to port H. On the other hand, the refrigerant does not flow through port F and port E because on-off valve 204 is closed although port F and port E communicate with each other.

Figure 5:
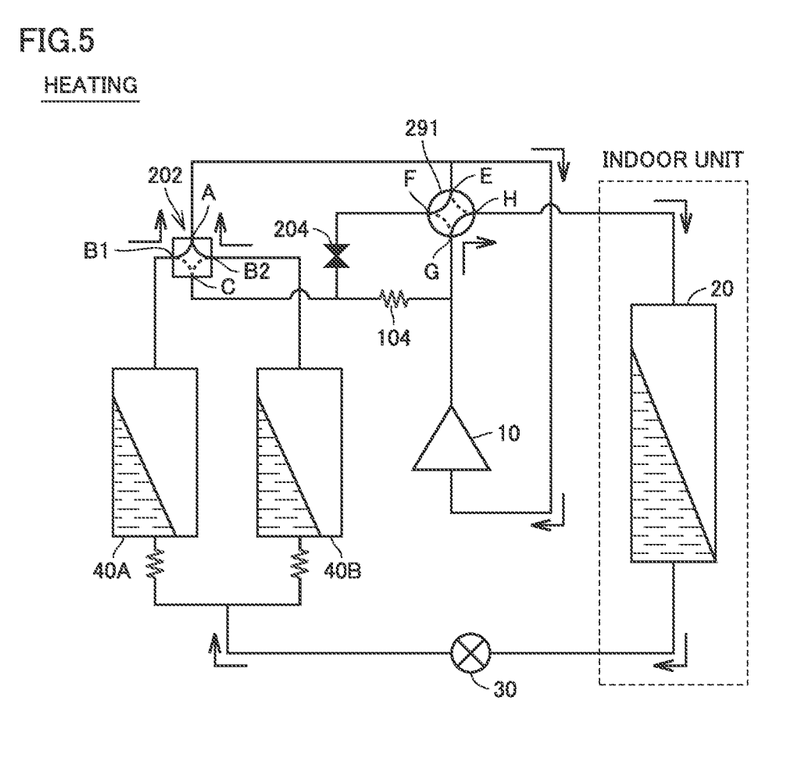
FIG. 5 shows a flow of the refrigerant in a normal heating operation mode.

The flow of the refrigerant in the normal heating operation mode is shown in FIG. 5.

(1-2) In a low-capacity heating operation mode, flow path switching valve 202 is set such that port B1, port B2 and port A communicate with one another and port C is cut off, similarly to the normal heating operation mode. The refrigerant flows from ports B1 and B2 to port A, and a state of the refrigerant at this time is, in one example, a gas-liquid two-phase state. Port A has a low pressure, ports B1 and B2 have a low pressure, and port C has a high pressure.

In four-way valve 291, the refrigerant flows from port G to port H. In addition, in the low-capacity heating operation mode, the refrigerant flows from port F to port E because on-off valve 204 is open.

Figure 6:
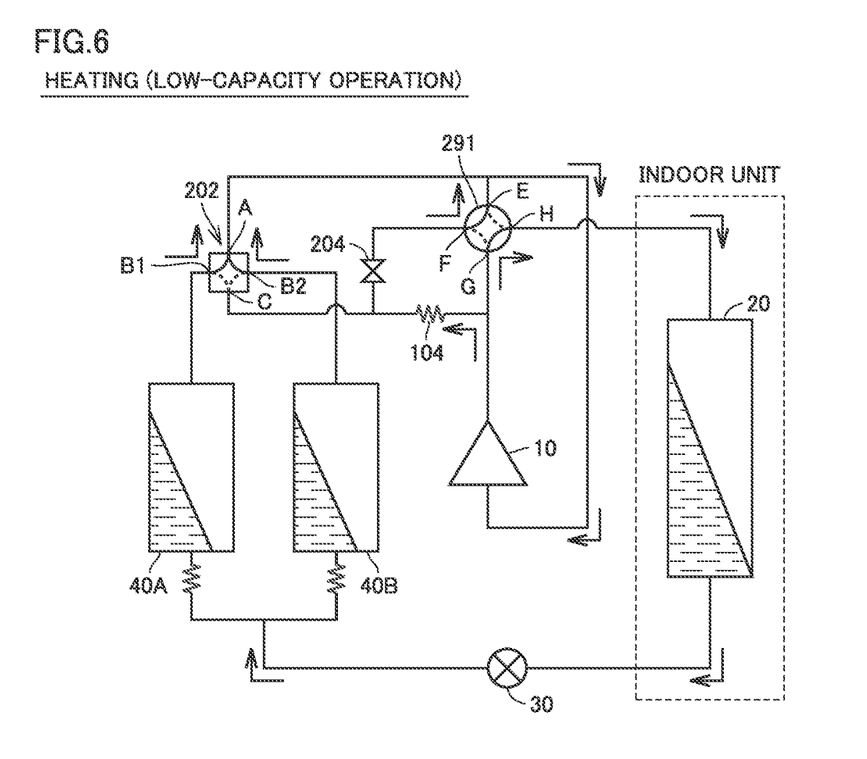
FIG. 6 shows a flow of the refrigerant in a low-capacity heating operation mode.

The flow of the refrigerant in the low-capacity heating operation mode is shown in FIG. 6.

(2-1) In the heating/defrosting operation mode, flow path switching valve 202 is set such that port A and port B1 communicate with each other and port B2 and port C communicate with each other. The refrigerant flows from port B1 to port A, and independently of this flow, the refrigerant flows from port C to port B2. A state of the refrigerant flowing from port C to port B2 is, in one example, a gas state. A state of the refrigerant flowing from port B1 to port A is, in one example, a gas state. Ports C and B2 have a medium pressure (where high pressure>medium pressure>low pressure), and ports A and B1 have a low pressure.

Figure 7:
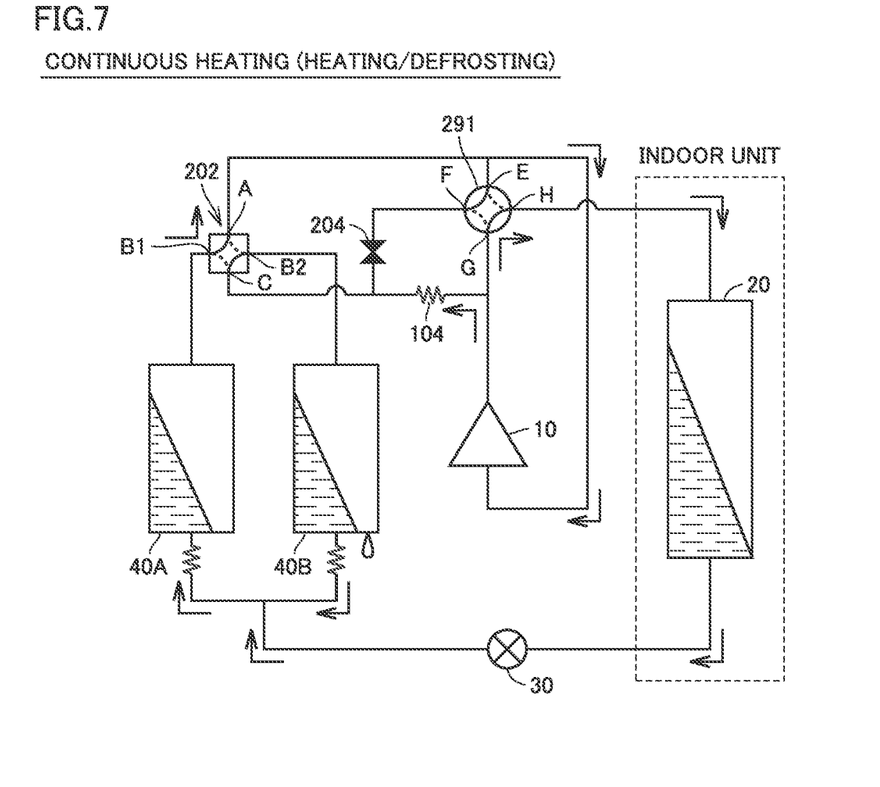
FIG. 7 shows a flow of the refrigerant in a heating/defrosting operation mode.

The flow of the refrigerant in the heating/defrosting operation mode is shown in FIG. 7. Referring to FIG. 7, during defrosting of heat exchange portion 40B in alternate defrosting, flow path switching valve 202 is set such that port A and port B1 communicate with each other and port B2 and port C communicate with each other. Then, a part of the high-temperature and high-pressure refrigerant discharged from compressor 10 is decompressed and flows through heat exchange portion 40B in a direction shown by an arrow. As a result, frost in heat exchange portion 40B melts. During that time, the liquid refrigerant from expansion valve 30 continues to flow through heat exchange portion 40A. Heat exchange portion 40A operates as an evaporator, and thus, the heating operation in indoor heat exchanger 20 can be maintained.

(2-2) In the defrosting/heating operation mode, flow path switching valve 202 is set such that port A and port B2 communicate with each other and port B1 and port C communicate with each other. The refrigerant flows from port B2 to port A, and independently of this flow, the refrigerant flows from port C to port B1. A state of the refrigerant flowing from port C to port B1 is, in one example, a gas state. A state of the refrigerant flowing from port B2 to port A is, in one example, a gas state. Ports A and B2 have a low pressure, and ports B1 and C have a medium pressure.

Figure 8:
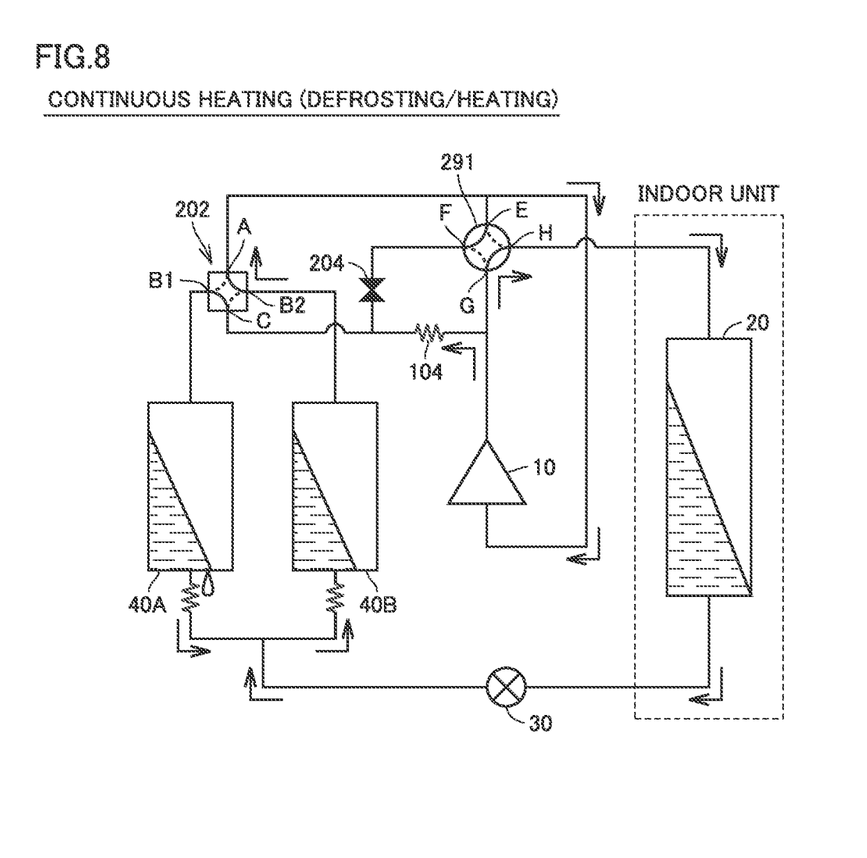
FIG. 8 shows a flow of the refrigerant in a defrosting/heating operation mode.

The flow of the refrigerant in the defrosting/heating operation mode is shown in FIG. 8. Referring to FIG. 8, during defrosting of heat exchange portion 40A in alternate defrosting, flow path switching valve 202 is set such that port A and port B2 communicate with each other and port B1 and port C communicate with each other. Then, a part of the high-temperature and high-pressure refrigerant discharged from compressor 10 is decompressed and flows through heat exchange portion 40A in a direction shown by an arrow. As a result, frost of heat exchange portion 40A melts. During that time, the liquid refrigerant from expansion valve 30 continues to flow through heat exchange portion 40B. Heat exchange portion 40B operates as an evaporator, and thus, the heating operation in indoor heat exchanger 20 can be maintained.

(3) In a cooling operation mode, flow path switching valve 202 is set such that port B1, port B2 and port C communicate with one another and port A is cut off. The refrigerant flows from port C to ports B1 and B2, and a state of the refrigerant at this time is, in one example, a gas single-phase state. Port A has a low pressure, ports B1 and B2 have a high pressure, and port C also has a high pressure.

Figure 9:
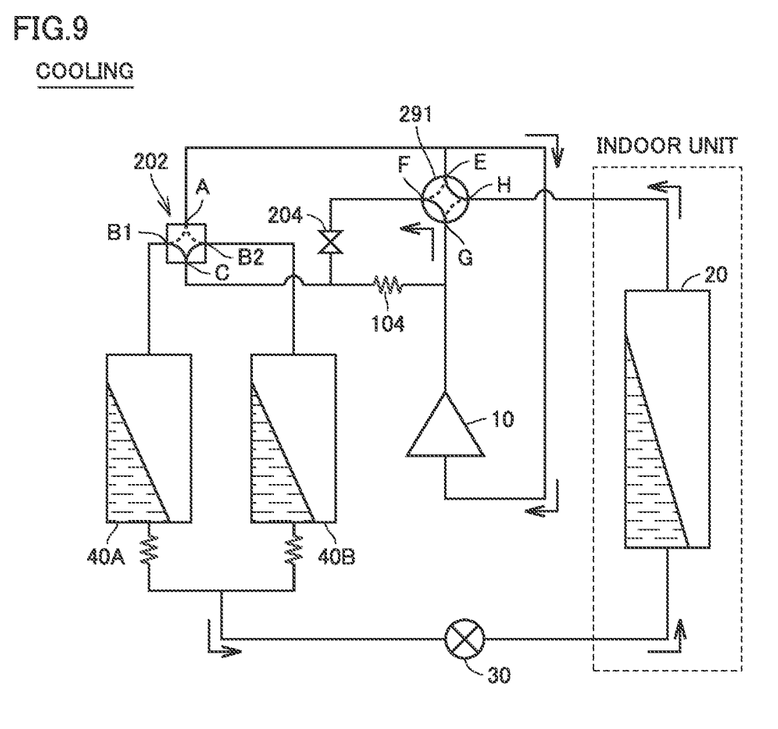
FIG. 9 shows a flow of the refrigerant in a cooling operation mode.

The flow of the refrigerant in the cooling operation mode is shown in FIG. 9. Referring to FIG. 9, in the cooling mode, four-way valve 291 is controlled such that port F connected to on-off valve 204 and port G communicate with each other and port E and port H communicate with each other. In addition, in the cooling mode, on-off valve 204 is open. The refrigerant discharged from compressor 10 flows through four-way valve 291, on-off valve 204, flow path switching valve 202, and outdoor heat exchanger 40 to expansion valve 30, and then, returns to compressor 10 through indoor heat exchanger 20.

Figure 10:
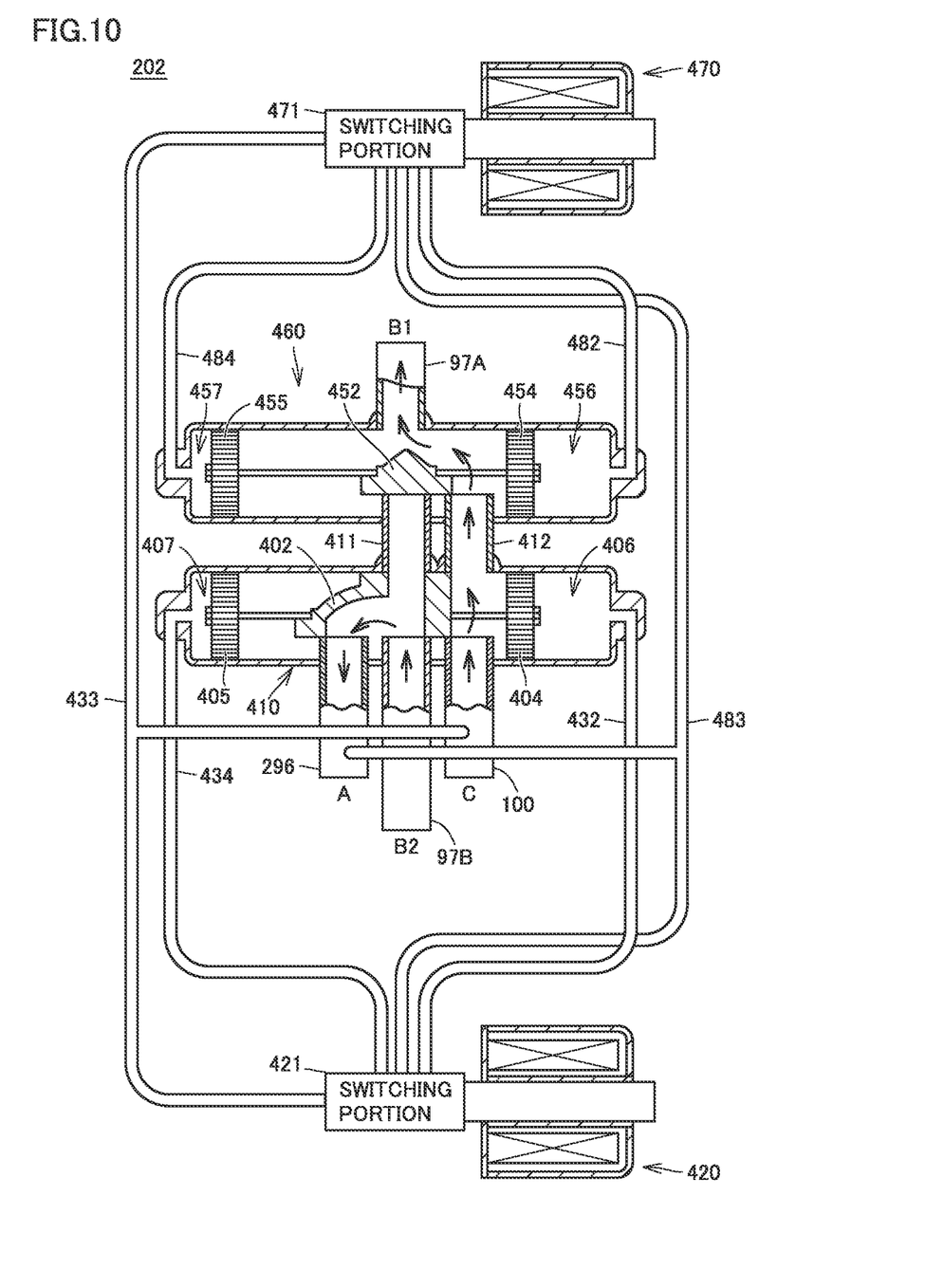
FIG. 10 is a schematic cross-sectional view showing a configuration of flow path switching valve 202.

FIG. 10 is a schematic cross-sectional view showing a configuration of flow path switching valve 202. Flow path switching valve 202 includes port A connected to the inlet of compressor 10, port B1 connected to heat exchange portion 40A, port B2 connected to heat exchange portion 40B, and port C connected to the outlet of compressor 10.

Flow path switching valve 202 further includes a cylinder 460 having a valve body 452 sliding therein, a pilot valve 470 configured to switch a pressure for driving valve body 452, a cylinder 410 having a valve body 402 sliding therein, and a pilot valve 420 configured to switch a pressure for driving valve body 402.

Valve body 452 is arranged in cylinder 460 and is configured to be slidable in an axial direction of cylinder 460. Partition members 454 and 455 are provided on both sides of valve body 452. A first chamber 456 is formed between partition member 454 and cylinder 460, and a second chamber 457 is formed between partition member 455 and cylinder 460. Due to a pressure difference between first chamber 456 and second chamber 457, valve body 452 of the slide valve is driven. Valve body 452 is configured to cause one of an intermediate port 411 and an intermediate port 412 to communicate with port B1 and close the other of intermediate port 411 and intermediate port 412.

Valve body 402 is arranged in cylinder 410 and is configured to be slidable in an axial direction of cylinder 410. Valve body 402 is processed such that a central portion thereof has an inverted U shape. Due to the portion having the inverted U shape, valve body 402 connects adjacent ports A and B2 or adjacent ports C and B2 such that the refrigerant can flow between adjacent ports A and B2 or between adjacent ports C and B2. Valve body 402 is further provided with a through hole communicating with intermediate port 411 or 412.

Partition members 404 and 405 are provided on both sides of valve body 402. A third chamber 406 is formed between partition member 404 and cylinder 410, and a fourth chamber 407 is formed between partition member 405 and cylinder 410. Due to a pressure difference between third chamber 406 and fourth chamber 407, valve body 402 of the slide valve is driven.

In a first state, valve body 402 causes intermediate port 411 to communicate with port A and port B2 and causes intermediate port 412 to communicate with port C. In a second state, valve body 402 causes intermediate port 412 to communicate with port B2 and port C and causes intermediate port 411 to communicate with port A.

Flow path switching valve 202 further includes pilot pipes 432, 433, 434, 482, 483, and 484. Pilot pipe 432 connects chamber 406 to a switching portion 421 of pilot valve 420. Pilot pipe 434 connects chamber 407 to switching portion 421 of pilot valve 420. Pilot pipe 482 connects chamber 456 to a switching portion 471 of pilot valve 470. Pilot pipe 484 connects chamber 457 to switching portion 471 of pilot valve 470.

Switching portion 421 and switching portion 471 are supplied with a high pressure from the outlet of compressor 10 by pilot pipe 433, and are supplied with a low pressure from the inlet of compressor 10 by pilot pipe 483. Pilot valve 420 and pilot valve 470 switch connection of switching portion 421 and switching portion 471, respectively, using a built-in spring and a built-in electromagnet. As a result, one of chambers 406 and 407 of cylinder 410 has a low pressure and valve body 402 slides toward the chamber having a low pressure. Similarly, one of chambers 456 and 457 of cylinder 460 has a low pressure and valve body 452 slides toward the chamber having a low pressure.

Flow path switching valve 202 is configured to use the pilot pipes and pilot valves 420 and 470 smaller in size than the main pipes and the main valves, and switch the main valves using a pressure difference between the main pipes connected to the main valves. Therefore, in air conditioner 201, a pipe structure such as pipe routing is simple and the number of welded portions is small, which leads to high work efficiency during manufacturing.

Positions of the valve bodies of flow path switching valve 202 and a flow of the refrigerant will be described below with reference to FIGS. 11 to 14 showing flow path switching valve 202 in a simplified manner.

Figure 11:
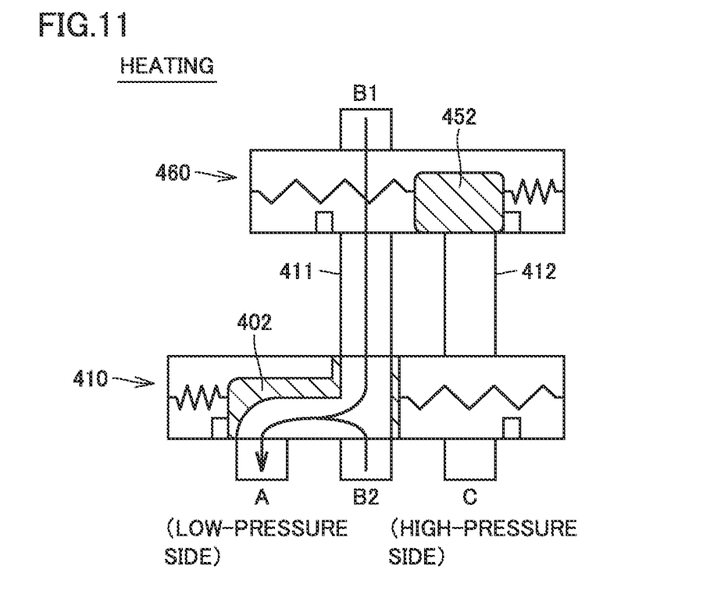
FIG. 11 shows positions of valve bodies of flow path switching valve 202 and a flow of the refrigerant during heating operation.

FIG. 11 shows positions of the valve bodies of flow path switching valve 202 and a flow of the refrigerant during the heating operation. During the heating operation, valve body 452 moves in the right direction to close intermediate port 412 and cause port B1 and intermediate port 411 to communicate with each other. Valve body 402 moves in the left direction to cause ports A and B2 and intermediate port 411 to communicate with each other. As a result, during the heating operation, port B1, port B2 and port A communicate with one another and port C does not communicate with the other connection ports.

Figure 12:
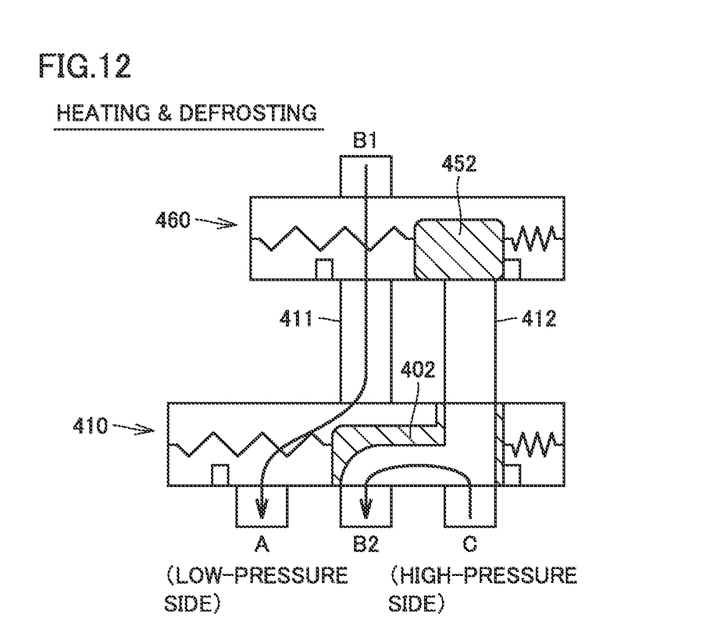
FIG. 12 shows positions of the valve bodies of flow path switching valve 202 and a flow of the refrigerant in the heating/defrosting mode (during defrosting operation of a heat exchange portion 40B).

FIG. 12 shows positions of the valve bodies of flow path switching valve 202 and a flow of the refrigerant in the heating/defrosting mode (during the defrosting operation of heat exchange portion 40B). Valve body 452 moves in the right direction to close intermediate port 412 and cause port B1 and intermediate port 411 to communicate with each other. Valve body 402 moves in the right direction to cause port B2 and port C to communicate with each other. As a result, during the defrosting operation of heat exchange portion 40B, port C and port B2 communicate with each other and port B1 and port A communicate with each other.

Figure 13:
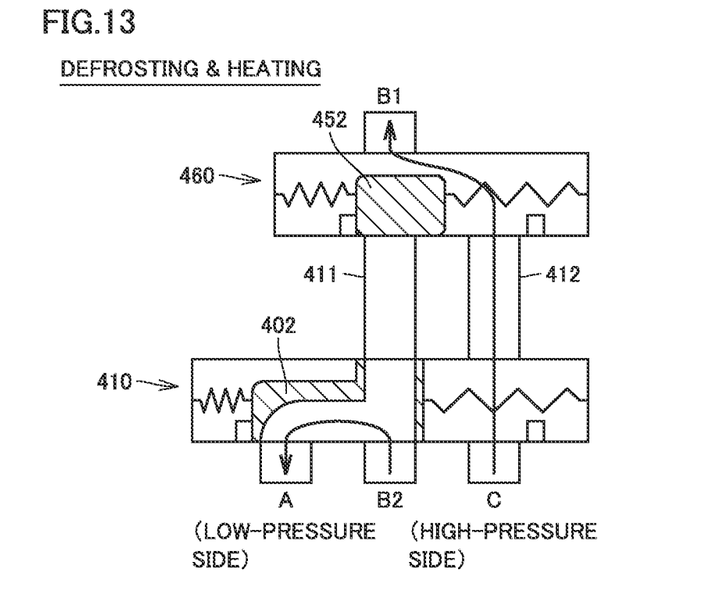
FIG. 13 shows positions of the valve bodies of flow path switching valve 202 and a flow of the refrigerant in the defrosting/heating mode (during defrosting operation of a heat exchange portion 40A).

FIG. 13 shows positions of the valve bodies of flow path switching valve 202 and a flow of the refrigerant in the defrosting/heating mode (during the defrosting operation of heat exchange portion 40A). Valve body 452 moves in the left direction to close intermediate port 411 and cause port B1 and intermediate port 412 to communicate with each other. Valve body 402 moves in the left direction to cause port B2 and port A to communicate with each other. As a result, during the defrosting operation of heat exchange portion 40A, port A and port B2 communicate with each other and port B1 and port C communicate with each other.

Figure 14:
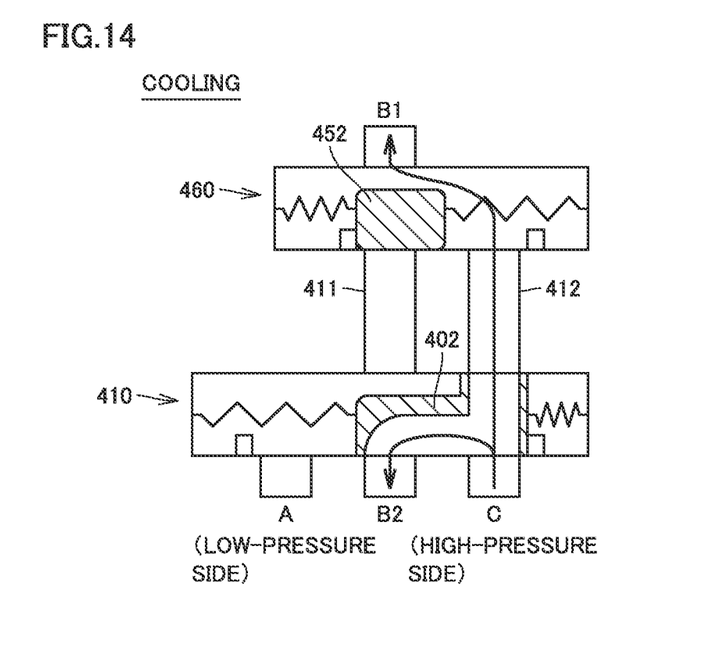
FIG. 14 shows positions of the valve bodies of flow path switching valve 202 and a flow of the refrigerant in the cooling mode.

FIG. 14 shows positions of the valve bodies of flow path switching valve 202 and a flow of the refrigerant in the cooling mode. Valve body 452 moves in the left direction to close intermediate port 411 and cause port B1 and intermediate port 412 to communicate with each other. Valve body 402 moves in the right direction to cause ports C and B2 and intermediate port 412 to communicate with each other. As a result, in the cooling mode, port B1, port B2 and port C communicate with one another and port A does not communicate with the other connection ports.

Since the description of the state of flow path switching valve 202 in each mode ends, air conditioner 201 described in the present embodiment will be summarized with reference to FIGS. 2 to 4 again.

Air conditioner 201 according to the present embodiment is configured such that the refrigerant circulates through compressor 10, indoor heat exchanger 20, expansion valve 30, and outdoor heat exchanger 40 in this order during the heating operation. Air conditioner 201 includes flow path switching valve 202, flow rate restricting portion 104 and on-off valve 204. Flow path switching valve 202 is provided in the flow path between compressor 10 and outdoor heat exchanger 40.

Outdoor heat exchanger 40 includes heat exchange portion 40A and heat exchange portion 40B, each of heat exchange portion 40A and heat exchange portion 40B having an independent flow path.

Flow path switching valve 202 includes port A, port B1, port B2, and port C. Port A is connected to the inlet of the compressor. Port B1 is connected to heat exchange portion 40A. Port B2 is connected to heat exchange portion 40B. Port C is connected to the outlet of compressor 10, with flow rate restricting portion 104 being interposed.

Flow path switching valve 202 is configured such that port B1, port B2 and port A communicate with one another and do not communicate with port C during the heating operation.

Flow path switching valve 202 is configured such that port C and port B1 communicate with each other and port B2 and port A communicate with each other during the defrosting operation of heat exchange portion 40A (defrosting/heating mode).

Flow path switching valve 202 is configured such that port C and port B2 communicate with each other and port B1 and port A communicate with each other during the defrosting operation of heat exchange portion 40B (heating/defrosting mode).

Flow rate restricting portion 104 and on-off valve 204 are connected in series between the outlet and the inlet of compressor 10 during the heating operation. On-off valve 204 is controlled to be opened and closed during the heating operation. A heating capacity of air conditioner 201 when on-off valve 204 is in an open state is lower than a heating capacity of air conditioner 201 when on-off valve 204 is in a closed state. This is because a part of the high-temperature and high-pressure refrigerant is bypassed along the path through on-off valve 204 as shown in FIG. 6.

With the above-described configuration, defrosting of outdoor heat exchanger 40 can be performed without interrupting the heating operation. In addition, by opening on-off valve 204, a part of the high-temperature and high-pressure refrigerant is bypassed without passing through the heat exchangers, and thus, the low-capacity heating operation can also be performed.

Preferably, air conditioner 201 further includes four-way valve 291. Four-way valve 291 is configured to, during the heating operation, connect the outlet of compressor 10 to indoor heat exchanger 20 and connect the inlet of compressor 10 to the outlet of compressor 10 with on-off valve 204 and flow rate restricting portion 104 being interposed. Four-way valve 291 is configured to, during the cooling operation, connect the outlet of compressor 10 to port C with on-off valve 204 being interposed and connect the inlet of compressor 10 to indoor heat exchanger 20.

The flow path between on-off valve 204 and flow rate restricting portion 104 is connected to port C.

Flow path switching valve 202 is configured such that port B1, port B2 and port C communicate with one another and do not communicate with port A during the cooling operation.

With the above-described configuration, in the air conditioner capable of performing cooling and heating, defrosting of outdoor heat exchanger 40 can be performed without interrupting the heating operation, and the low-capacity heating operation can also be performed.

Preferably, flow path switching valve 202 further includes cylinder 460 and cylinder 410. Cylinder 460 has valve body 452 sliding therein, valve body 452 being configured to cause one of intermediate port 411 and intermediate port 412 to communicate with port B1 and close the other of intermediate port 411 and intermediate port 412. Cylinder 410 has valve body 402 sliding therein. Valve body 402 slides to thereby switch a communication state in flow path switching valve 202 between the first state and the second state. The first state is a state in which intermediate port 411 communicates with port A and port B2 and intermediate port 412 communicates with port C. The second state is a state in which intermediate port 412 communicates with port B2 and port C and intermediate port 411 communicates with port A.

With the above-described configuration, even when switching is performed between the cooling operation and the heating operation, the high pressure side and the low pressure side are fixed in flow path switching valve 202. It is possible to implement a switching mechanism using the high and low pressures in the pipes connected to flow path switching valve 202 itself. Therefore, it is possible to implement compact flow path switching valve 202 that is low in pressure loss and does not need to supply the valve body driving pressure to the switching valve by another pipe. Since the valve in the circuit that allows continuous heating can be implemented using the pressure of the pipes connected to the valve itself as a driving source, pipe routing of the air conditioner can become easier and the number of welded portions can be reduced.

It should be understood that the embodiment disclosed herein is illustrative and non-restrictive in every respect. The scope of the present invention is defined by the terms of the claims, rather than the description of the embodiment above, and is intended to include any modifications within the scope and meaning equivalent to the terms of the claims.

REFERENCE SIGNS LIST 1, 201 air conditioner; 10 compressor; 20 indoor heat exchanger; 30 expansion valve; 40 outdoor heat exchanger; 40A, 40B heat exchange portion; 52 pressure sensor; 54 temperature sensor; 90, 92, 94, 94A, 94B, 96, 97A, 97B, 98 to 101, 296 pipe; 91, 102A, 102B, 291 four-way valve; 102 flow path switching portion; 104 flow rate restricting portion; 202 flow path switching valve; 204 on-off valve; 300 controller; 402, 452 valve body; 404, 405, 454, 455 partition member; 406, 407, 456, 457 chamber; 410, 460 cylinder; 411, 412 intermediate port; 420, 470 pilot valve; 421, 471 switching portion; 432 to 434, 482 to 484 pilot pipe; A, B1, B2, C, E, F, G, H port.

The invention claimed is:

1. An air conditioner configured such that refrigerant circulates through a compressor, an indoor heat exchanger, an expansion valve, and an outdoor heat exchanger in this order during heating operation, the air conditioner comprising
a switching valve provided in a flow path between the compressor and the outdoor heat exchanger,
the outdoor heat exchanger including a first heat exchange portion and a second heat exchange portion, each of the first heat exchange portion and the second heat exchange portion having an independent flow path,
the switching valve including:
a first connection port connected to an inlet of the compressor;
a second connection port connected to the first heat exchange portion;
a third connection port connected to the second heat exchange portion; and
a fourth connection port connected to an outlet of the compressor,
during the heating operation, the second connection port, the third connection port and the first connection port communicating with one another, and not communicating with the fourth connection port,
during defrosting operation of the first heat exchange portion, the fourth connection port and the second connection port communicating with each other, and the third connection port and the first connection port communicating with each other,
during defrosting operation of the second heat exchange portion, the fourth connection port and the third connection port communicating with each other, and the second connection port and the first connection port communicating with each other,
the air conditioner further comprising
a flow rate restricting portion and an on-off valve connected in series between the outlet and the inlet of the compressor during the heating operation, and
a four-way valve configured to, during the heating operation, connect the outlet of the compressor to the indoor heat exchanger and connect the inlet of the compressor to the outlet of the compressor with the on-off valve and the flow rate restricting portion being interposed, and configured to, during cooling operation, connect the outlet of the compressor to the fourth connection port with the on-off valve being interposed and connect the inlet of the compressor to the indoor heat exchanger, wherein
a flow path between the on-off valve and the flow rate restricting portion is connected to the fourth connection port, and
the switching valve is configured such that the second connection port, the third connection port and the fourth connection port communicate with one another and do not communicate with the first connection port during the cooling operation.

2. The air conditioner according to claim 1, wherein the switching valve further includes:
a first cylinder having a first valve body sliding therein, the first valve body being configured to cause one of a first intermediate port and a second intermediate port to communicate with the second connection port and close the other of the first intermediate port and the second intermediate port; and
a second cylinder having a second valve body sliding therein, the second valve body being configured to perform switching between a first state and a second state, the first state being a state in which the first intermediate port communicates with the first connection port and the third connection port and the second intermediate port communicates with the fourth connection port, the second state being a state in which the second intermediate port communicates with the third connection port and the fourth connection port and the first intermediate port communicates with the first connection port.

* * * * *